US006376581B1

(12) United States Patent
Tanaka et al.

(10) Patent No.: US 6,376,581 B1
(45) Date of Patent: Apr. 23, 2002

(54) CEMENT DISPERSANT, METHOD FOR PRODUCTION THEREOF, AND CEMENT COMPOSITION USING THE DISPERSANT

(75) Inventors: Yoshio Tanaka, Tokyo; Akira Ohta, Kanagawa; Tsuyoshi Hirata, Kanagawa; Toru Uno, Kanagawa; Tsutomu Yuasa, Kanagawa; Hideyuki Tahara, Osaka, all of (JP)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/702,858

(22) Filed: Nov. 1, 2000

Related U.S. Application Data

(62) Division of application No. 08/679,278, filed on Jul. 12, 1996, now Pat. No. 6,187,841.

(30) Foreign Application Priority Data

Jul. 13, 1995 (JP) ............................. 7-177523
Jul. 13, 1995 (JP) ............................. 7-177524
Jul. 13, 1995 (JP) ............................. 7-177525

(51) Int. Cl.[7] ................................................ C08K 3/00
(52) U.S. Cl. .......................................................... 524/5
(58) Field of Search .......................................... 524/4, 5

(56) References Cited

U.S. PATENT DOCUMENTS

| | | | | |
|---|---|---|---|---|
| 4,524,163 A | 6/1985 | Bradley | ............ | 514/5 |
| 5,362,829 A | 11/1994 | Kinoshita | ............ | 524/5 |
| 5,919,881 A | * 7/1999 | Kinoshita | ............ | 526/287 |
| 6,176,921 B1 | * 7/2001 | Kinoshita | ............ | 106/809 |

FOREIGN PATENT DOCUMENTS

| | | |
|---|---|---|
| EP | 0 303 747 | 2/1989 |
| EP | 0 612 702 A1 | 8/1994 |
| EP | 0 725 044 A1 | 8/1996 |
| FR | 2 635 320 | 2/1990 |
| FR | 2 706 447 | 12/1994 |
| GB | 2 221 673 A | 2/1990 |
| GB | 2 280 180 | 1/1995 |
| JP | 54-139929 | 10/1979 |
| JP | 59-018338 | 4/1984 |
| JP | 60-016851 | 1/1985 |
| JP | 63-162562 | 7/1988 |
| JP | 5-238795 | 9/1993 |
| JP | 8-012396 | 1/1996 |
| WO | WO 95/11204 | 4/1995 |
| WO | WO 95/16643 | 6/1995 |

* cited by examiner

*Primary Examiner*—Christopher Henderson
(74) *Attorney, Agent, or Firm*—Burns, Doane, Swecker & Mathis, LLP

(57) ABSTRACT

A cement dispersant having excellent ability to prevent slump loss and high water-reducing property which comprises a polycarboxylic acid type polymer having a specific molecular weight distribution, a method for the production thereof, and a cement composition using the dispersant are provided. The cement dispersant comprises as a main component thereof a polycarboxylic acid type polymer (A), having a weight average molecular weight in the range of 10,000 to 500,000 in terms of polyethylene glycol determined by gel permeation chromatography, and having a value determined by subtracting the peak top molecular weight from the weight average molecular weight in the range of 0 to 8,000.

13 Claims, 1 Drawing Sheet

CEMENT DISPERSANT, METHOD FOR PRODUCTION THEREOF, AND CEMENT COMPOSITION USING THE DISPERSANT

This application is a divisional, of Application Ser. No. 08/679,278, filed Jul. 12, 1996 now U.S. Pat. No. 6,187,841.

BACKGROUND OF THE INVENTION

1. Field of the Invention

This invention relates to a cement dispersant, a method for the production thereof, and a cement composition using the cement dispersant. More particularly, it relates to a cement dispersant which improves the dispersibility of cement particles, heightens the flowability of a cement composition, prevents the heightened flowability of cement composition from degradation by aging, and entrains a suitable amount of air to impart perfect workability to the cement composition and ensure formation of a concrete with high strength, a method for the production thereof, and a cement composition using the cement dispersant.

2. Description of the Prior Art

Since the early deterioration of concrete structures raised a serious social issue in 1981, the desirability of decreasing the unit water content of concrete and enhancing the workability and durability of concrete has been finding enthusiastic recognition. This has led to considerable work in the development of cement dispersants which have a considerable effect on the quality and performance of cement compositions.

Workability and consistency of cement compositions reduce gradually with the elapse of time after preparation because of the reaction of hydration of cement with water, for example. This results in a loss in workability, typified by a slump loss of concrete. The magnitude of this slump loss increases in proportion as the unit water content of the cement composition decrease, and as the water reducing ratio in the cement composition increases in conformity with the recent trend. The slump loss of this nature in fresh concrete constitutes a major cause for the limitation imposed on the time allowed for transportation, the alteration of quality and the impairment of formability owing to the waiting time at the site of placement, and such troubles as decline of durability originating as from cold joints. At a factory for the manufacture of secondary concrete products, when the forced transfer of a cement composition with a pump is temporarily suspended and then resumed, the slump loss induces such accidents as a sudden increase in the pressure of forced transfer and a block in the operation of the pump. When the cement composition is placed in a mold and then such a work of formation as compaction is delayed for some reason, the slump loss may result in incomplete placement. At places such as a factory for the preparation of fresh concrete and a factory for the manufacture of secondary concrete products, therefore, the slump loss poses an important task awaiting solution for the quality control of a cement composition and the improvement of work execution.

Various admixture makers, therefore, have been energetically pursuing the development of a so-called high range, air-entraining, water-reducing agent which possesses a high water-reducing property, suffers only a small slump loss, and may be added to the cement composition at a factory for the preparation of fresh concrete. At present, the high range, air-entraining, water-reducing agents of naphthalene type, aminosulfonic acid type, and polycarboxylic acid type are available. An example of a polycarboxylic acid type high range, air-entraining, water-reducing agent is the copolymer which is produced by introducing a polyalkylene glycol mono (meth) acrylic ester type monomer and a (meth) acrylate type monomer together with a monomer copolymerizable with these monomers at a specific ratio as disclosed in JP-B-59-18,338. Other examples include the copolymer which is obtained by polymerizing a polyalkylene glycol diester type monomer having an unsaturated bond and a monomer having a dissociating group as disclosed in JP-A-5-238,795, and the copolymer of a polyalkylene glycol type monomer with an unsaturated bond as an essential component and another specific monomer as disclosed in JP-A-8-12,396. Though these polycarboxylic acid type high range, air-entraining, water-reducing agents have high water-reducing properties and slump-retaining function, they are still not completely satisfactory. Various methods have been proposed for imparting to cement compositions an improved capacity for preventing slump loss. JP-A-54-139,929, for example, teaches a method for preventing slump loss by causing a granular naphthalene-sulfonic acid-formalin condensate to be gradually dissolved in a cement composition. JP-A-60-16,851 discloses a method for preventing slump loss by causing a granular copolymer of an olefin with an ethylenically unsaturated dicarboxylic anhydride to be gradually dissolved by hydrolysis in a cement composition. However, the granular natures of the materials mean that they are not storage stable in dispersion form and their effect is not uniform throughout a cement composition to which they are able. JP-A-63-162,562 proposes a method which comprises causing a cement dispersant to be contained in an organic hydrogel such as polyacrylic acid and ensuring gradual release of the dispersant ultimately in a cement composition. This method, however, suffers problematic stability of separation and precipitation because it requires inclusion of a gel insoluble in water.

When very low water/cement ratio (by weight), in the range of 15 to 40%, is used with a view to enhancing strength, impartation of veritably high flowability to a cement composition is difficult to attain even by the polycarboxylic acid type high range, air-entraining water-reducing agent which is reputed to have the highest water-reducing ability among all the high range, air-entraining water-reducing agents of this class. Further, the cement composition has the problem of acquiring no ample workability because of the large slump loss.

An object of this invention, therefore, is to provide a cement dispersant liberated from the problems mentioned above and endowed with an ideal ability to prevent slump loss, a method for the production thereof, and a cement composition using this cement dispersant.

Another object of this invention is to provide a cement dispersant which imparts lasting excellent flowability even to a cement composition having a water/cement ratio (by weight) in the range of 15 to 40% and a cement composition which contains the cement dispersant.

SUMMARY OF THE INVENTION

The object mentioned above is accomplished by (i) a cement dispersant having as a main component thereof a polycarboxylic acid type polymer (A) or salt thereof, wherein the polymer (A) has a weight average molecular weight in the range of 10,000 to 500,000 in terms of polyethylene glycol determined by gel permeation chromatography (hereinafter referred to "GPC"), and has a value determined by subtracting the peak top molecular weight from the weight average molecular weight in the range of 0 to 8,000.

In this case, the term, "peak top molecular weight" which is used in this invention represents a molecular weight which corresponds to the highest position of the curve plotted on the tested polymer in the GPC chart.

The object can be also attained by (ii) a cement dispersant set forth in (i) above, wherein the polycarboxylic acid type polymer (A) is obtained by copolymerizing 5 to 98% by weight of an (alkoxy)polyalkylene glycol mono(meth)acrylic ester type monomer (a) represented by the following general formula (1):

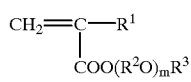

(1)

wherein $R^1$ stands for a hydrogen atom or a methyl group, $R^2O$ for one species or a mixture of two or more species of oxyalkylene group of 2 to 4 carbon atoms, providing two or more species of the mixture may be added either in the form of a block or in a random form, $R^3$ for a hydrogen atom or an alkyl group of 1 to 5 carbon atoms, and m is a value indicating the average addition mol number of oxyalkylene groups which is an integer in the range of 1 to 100, 95 to 2% by weight of a (meth)acrylic acid type monomer (b) represented by the following general formula (2):

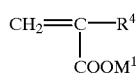

(2)

wherein $R^4$ stands for a hydrogen atom or a methyl group and $M^1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b) and (c) is 100% by weight.

This object is further accomplished by (iii) a cement dispersant set forth in (ii) above, wherein the (alkoxy)polyalkylene glycol mono(meth)acrylic ester type monomer (a) is (methoxy)polyethylene glycol mono (meth) acrylate and the (meth)acrylic acid type monomer (b) is (meth) acrylic acid.

This object is further accomplished by (iv) a cement dispersant set forth in (i) or (ii) above, wherein the adsorption ratio of the polymer (A) onto cement particles is less than 60% at room temperature for 5 minutes when added in an amount of 0.2% by weight to that of the cement.

This object is further accomplished by (v) a cement dispersant set forth in (i) or (ii) above, wherein the adsorption ratio of the polymer (A) onto cement particles is not less than 60% at room temperature for 5 minutes when added in an amount of 0.2% by weight to that of the cement.

This object is further accomplished by (vi) a method for the production of a cement dispersant as hereinabove defined, which comprises drip-feeding over time into a reaction vessel containing water a monomer mixture (I) containing an unsaturated carboxylic acid type monomer as an essential component under such conditions that the amount of the monomer mixture (I) used is in the range of 10 to 28% by weight to that of the total starting raw materials, the polymerization being effected at a temperature of not more than the cloud point of the monomer mixture (I), and the neutralization ratio of the monomer mixture (I) being in the range of 0 to 20 mol %, and carrying out a polymerization reaction.

This object is further accomplished by (vii) a method for the production of a cement dispersant as hereinabove defined, which comprises drip-feeding over time into a reaction vessel containing water a monomer mixture (I) containing an unsaturated carboxylic acid type monomer as an essential component under such conditions that the neutralization ratio of the monomer mixture (I) being in the range of 0 to 20 mol %, the monomer mixture (I) being mixed with a chain transfer agent prior to a polymerization reaction, and carrying out the polymerization reaction.

This object is further accomplished by (viii) a method for the production of a cement dispersant set forth in (vi) or (vii) above, wherein the monomer mixture (I) comprises 5 to 98%by weight of an (alkoxy)polyalkylene glycol mono (meth)acrylic ester type monomer (a) represented by the following general formula (1):

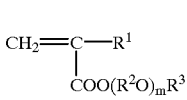

(1)

wherein $R^1$ stands for a hydrogen atom or a methyl group, $R^2O$ for one species or a mixture of two, or more species of oxyalkylene group of 2 to 4 carbon atoms, providing two or more species of the mixture may be added either in the form of a block or in a random form, $R^3$ for a hydrogen atom or an alkyl group of 1 to 5 carbon atoms, and m is a value indicating the average addition mol number of oxyalkylene groups which is an integer in the range of 1 to 100, 95 to 2% by weight of a (meth)acrylic acid type monomer (b) represented by the following general formula (2):

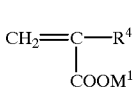

(2)

wherein $R^4$ stands for a hydrogen atom or a methyl group and $M^1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b) and (c) is 100% by weight.

This object is also accomplished by (ix) a cement composition comprising at least cement, water, and a cement dispersant, characterized by containing the cement dispersant set forth in (i) or (ii) above.

The cement dispersant of this invention is excellent in water-reducing ability and is free from the slump loss which is the problem suffered by the conventional high range, air-entraining, water-reducing agent. The cement dispersant, therefore, permits a cement composition such as concrete to be kneaded at a high water-reducing ratio, slump loss is minimal, and, many of quality control and workability problems of the prepared concrete may be overcome. Further, the cement dispersant set forth in (iv) above has a much improved ability to prevent slump loss, and the cement dispersant set forth in (v) above can maintain sufficient flowability in the cement composition having an extremely low water/cement ratio.

The method for the production of a cement dispersant of this invention permits the preparation of a cement dispersant which is very effective in the prevention of slump loss and which has considerable water-reducing capability, thus providing many economic advantages.

The cement composition of this invention far excels the conventional cement compositions in the slump-retaining time and water-reducing ability.

DESCRIPTION OF THE PREFERRED EMBODIMENT

Figure 1:
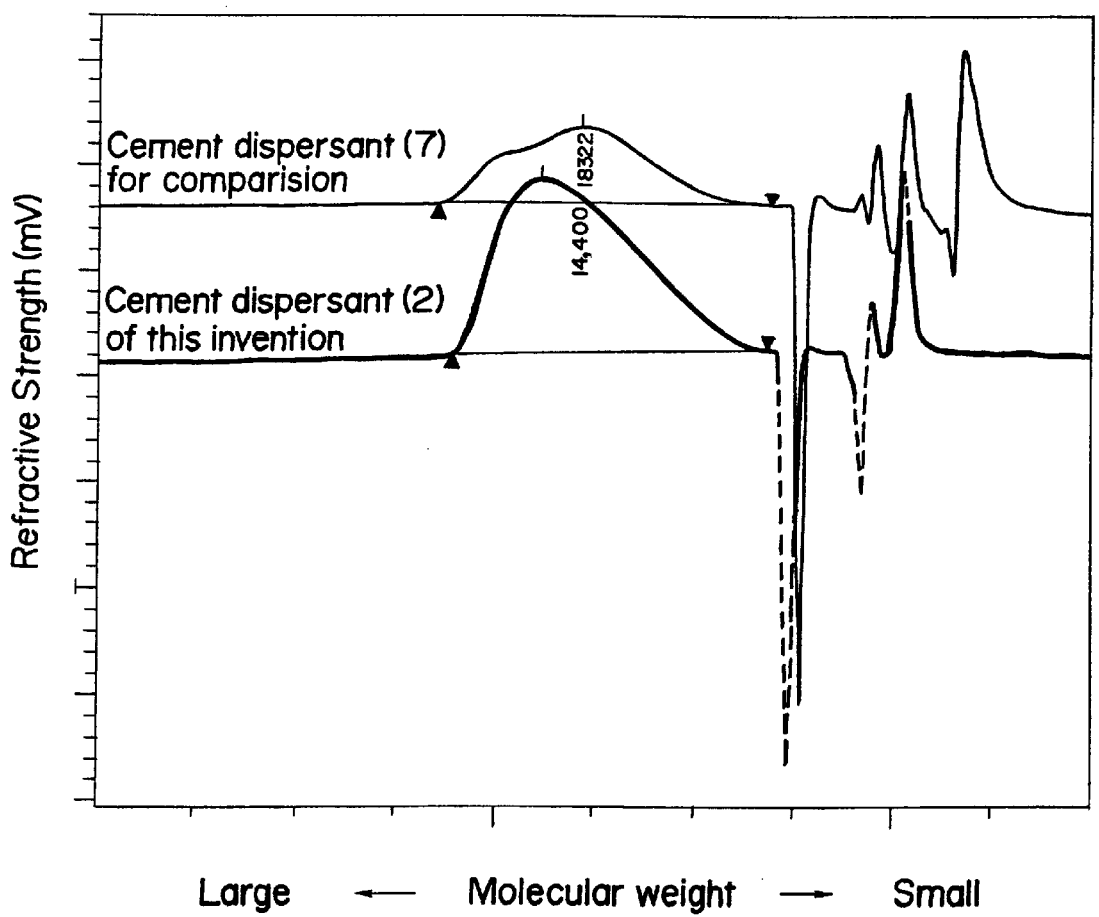
FIG. 1 illustrates molecular weight distributions of cement dispersant (2) of this invention and the cement dispersant (7) for comparison.

The term "polycarboxylic acid type polymer (A)" used as the main component of the cement dispersant of this invention refers generally to a polymer obtained by polymerizing a monomer mixture (I) containing an unsaturated carboxylic acid type monomer as an essential component thereof. The monomer mixture (I) preferably comprises 5 to 98% by weight of an (alkoxy)polyalkylene glycol mono(meth)acrylic ester type monomer (a) represented by the following general formula (1):

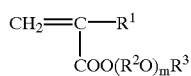

(1)

wherein $R^1$ stands for a hydrogen atom or a methyl group, $R^2O$ for one species or a mixture of two or more species of oxyalkylene group of 2 to 4 carbon atoms, providing two or more species of the mixture may be added either in the form of a block or in a random form, $R^3$ for a hydrogen atom or an alkyl group of 1 to 5 carbon atoms, and m is a value indicating the average addition mol number of oxyalkylene groups which is an integer in the range of 1 to 100, 95 to 2% by weight of a (meth)acrylic acid type monomer (b) represented by the following general formula (2):

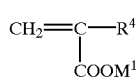

(2)

wherein $R^4$ stands for a hydrogen atom or a methyl group and $M^1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b) and (c) is 100% by weight.

As typical examples of the monomer (a) mentioned above, hydroxyethyl (meth)acrylate, hydroxypropyl (meth) acrylate, polyethylene glycol mono(meth)acrylate, polypropylene glycol mono (meth) acrylate, polybutylene glycol mono (meth) acrylate, polyethylene glycol polypropylene glycol mono(meth)acrylate, polyethylene glycol polybutylene glycol mono (meth) acrylate, polypropylene glycol polybutylene glycol mono(meth)acrylate, polyethylene glycol polypropylene glycol polybutylene glycol mono(meth) acrylate, methoxy polyethylene glycol mono(meth)acrylate, methoxy polypropylene glycol mono(meth)acrylate, methoxy polybutylene glycol mono(meth)acrylate, methoxy polyethylene glycol polypropylene glycol mono(meth) acrylate, methoxy polyethylene glycol polybutylene glycol mono(meth)acrylate, methoxy polypropylene glycol polybutylene glycol mono(meth)acrylate, methoxy polyethylene glycol polypropylene glycol polybutylene glycol mono (meth)acrylate, ethoxy polyethylene glycol mono(meth) acrylate, ethoxy polypropylene glycol mono(meth)acrylate, ethoxy polybutylene glycol mono(meth)acrylate, ethoxy polyethylene glycol polpropylene glycol mono( meth) acrylate , ethoxy polyethylene glycol polybutylene glycol mono(meth)acrylate, ethoxy polypropylene glycol polybutylene glycol mono (meth) acrylate, and ethoxy polyethylene glycol polypropylene glycol polybutylene glycol mono (meth)acrylate may be cited. These monomers may be used either singly or in the form of a mixture of two or more members.

While not being bound in any way by the following explanation, it is believed that the cement dispersant of this invention, after having been adsorbed onto cement, manifests strong cement-dispersing effects by its hydrophilicity and steric repulsion of polyalkylene glycol chain which the monomer (a) contains. From this view point, the polyalkylene glycol chain has preferably a large number of oxyethylene groups with a high hydrophilicity. Particularly, methoxy polyethylene glycol mono (meth) acrylate is preferably used as the monomer (a). Further, the average addition mole number of the oxyethylene group is preferably in the range of 1 to 100. For the purpose of obtaining high hydrophilicity and steric repulsion, the average addition mole number of the oxyethylene group is most preferably in the range of 5 to 100.

Typical examples of the monomer (b) mentioned above include acrylic acid and methacrylic acid, and monovalent metal salts, divalent metal salts, ammonium salts, and organic amine salts thereof. These monomers may be used either singly or in the form of a mixture of two or more monomers.

Typical examples of the monomer (c) mentioned above include esters of aliphatic alcohols of 1 to 20 carbon atoms with (meth) acrylic acid; such unsaturated dicarboxylic acids as maleic acid, fumaric acid, and citraconic acid and monovalent metal salts, divalent metal salts, ammonium salts, and organic amine salts thereof; monoesters or diesters of such unsaturated dicarboxylic acids as maleic acid, fumaric acid, and citraconic acid with aliphatic alcohols of 1 to 20 carbon atoms, with glycols of 2 to 4 carbon atoms, or with (alkoxy)polyalkylene glycols of 2 to 100 addition mols of such glycols as mentioned above; unsaturated amides such as (meth)acrylamide and (meth) acrylalkylamide; such vinyl esters as vinyl acetate and vinyl propionate; such aromatic vinyls as styrene; and such unsaturated sulfonic acids as (meth)allyl sulfonic acid, sulfoethyl (meth)acrylate, 2-methyl propanesulfonic acid (meth) acrylamide, and styrene sulfonic acid and monovalent metal salts, divalent metal salts, ammonium salts, and organic amine salts thereof. These monomers may be used either singly or in the form of a mixture of two or more monomers.

The appropriate ratio of the amounts of the monomer (a), the monomer (b), and the monomer (c) used is such that the proportion of the monomer (a) is in the range of 5 to 98% by weight, preferably 25 to 96% by weight, and more preferably 40 to 94% by weight, that of the monomer (b) is in the range of 95 to 2% by weight, preferably 75 to 4% by weight, and more preferably 60 to 6% by weight, and that of the monomer (c) is in the range of 0 to 50% by weight, preferably 0 to 30% by weight, and more preferably 0 to 10% by weight.

The weight average molecular weight of the polycarboxylic acid type polymer (A) is in the range of 10,000 to 500,000, preferably 10,000 to 100,000, in terms of polyethylene glycol determined by GPC. Further, the value determined by subtracting the peak top molecular weight from the weight average molecular weight of the polymer (A) should lie within the range of 0 to 8,000, preferably in the range of 0 to 7,000.

If the weight average molecular weight is less than 10,000 or more than 500,000, the ability of the produced cement dispersant to reduce the water content will be unacceptably lowered. If the value determined by subtracting the peak top molecular weight from the weight average molecular weight exceeds 8,000, the ability of the produced cement dispersant to prevent slump loss will be unduly low.

The cement dispersant in accordance with the present invention is a cement dispersant which contains as a main component the above-mentioned polycarboxylic acid type polymer (A) having a specific weight average molecular weight and a specific value determined by subtracting the peak top molecular weight from the weight average molecular weight.

Generally, it is known that cement dispersing properties of the polymer used in the cement dispersant have a relationship with the molecular weight thereof, and there is an optimum range in the weight average molecular weight (Mw) However, when a distribution of the molecular weight of the obtained polymer is studied in detail, several kinds of distributions of the molecular weight may be obtained, such as peak top molecular weight (Mp) which is positioned at the lower molecular weight side of Mw or at the higher molecular weight side of Mw, even if the Mw is the same. And, for example, even if the Mw is the same, the polymer wherein Mp is much lower, i.e., Mw−Mp>8,000 contains a large amount of higher-molecular weight polymers which have low cement dispersibility. It, therefore, is necessary to increase the amount of the cement dispersant added to attain the same flow value, or slump loss prevention ability sometimes decreases. On the contrary, when the polymer has a distribution of the molecular weight of Mw−Mp<0, there are present lower-molecular weight polymers in larger proportions, and the amount of air entrained is increased, which is not desirable. Such a polymer is formed by polymerizing the monomer mixture (I) at a temperature higher than the cloud point or polymerizing the monomer mixture (I) with a chain transfer agent separately drip-fed into a reaction vessel. In this case, when the monomer mixture (I) is polymerized at a temperature higher than the cloud point, for example, the monomer mixture (I) separates into two parts, namely a suspended part which is insoluble in water and an aqueous part which is soluble in water, and high-molecular weight material forms in the suspended part because of the high concentration of polymerizable material therein. When the polymerization is executed by the monomer mixture (I) and chain transfer agent separately drip-fed into a reaction vessel containing water, it takes a little longer time for the chain transfer agent to dissolve in water uniformly. Therefore, the monomer mixture (I) contacting with the drop of a chain transfer agent will form only a low-molecular weight material.

It is more preferable that the polycarboxylic acid type polymer (A) satisfies one of the following conditions (i) and (ii) in order that the best properties as cement dispersant be obtained:

(i) When the adsorption ratio of the polymer (A) onto cement particles is less than 60%, preferably less than 50%, at room temperature for 5 minutes when added in an amount of 0.2% by weight to that of the cement.

(ii) When the adsorption ratio of the polymer (A) onto cement particles is not less than 60% at room temperature for 5 minutes when added in an amount of 0.2% by weight to that of the cement.

The adsorption ratio of the polycarboxylic acid type polymer (A) onto cement particles can be determined and calculated by the following method:

Firstly, the polymer (A) is charged into a beaker to give a proportion of 0.2% by weight solids on cement, and then a prescribed amount of water is added thereto. After adding a specific amount of cement into the same beaker and stirring for a specific period, the resultant mixture is filtered. The concentration of the polymer (A) remained in the filtrate thus obtained is determined by a differential refractive index dector. The adsorption ratio is calculated by the following equation.

Adsorption ratio (%)=[{(Concentration of (A) added)−(Concentration of (A) remained in filtrate)}/{Concentration of (A) added}]×100

If all the polymers (A) are adsorbed onto cement particles and no polymers (A) are detected in the filtrate, the adsorption ratio is calculated as 100%.

When the polymer (A) satisfies the condition (i), in the cement dispersant of this invention, the flowability of the obtained cement composition can be maintained for a long period. Further, when the polymer (A) satisfies the condition (ii), the cement dispersant of the present invention can confer sufficient flowability even in a cement composition with an extremely low water/cement ratio.

In addition, when the polymer (A) satisfies the condition (ii), the cement dispersant of this invention, when used with a water/cement ratio of 60% by weight which is generally used, can be imparted by the addition thereof in an extremely small amount with such an advantageous mortar properties as of a mortar flow value of not less than 100 mm and an amount of entrained air of not more than 10% in the performance evaluation test for mortar.

We found that the adsorption of the carboxylic acid type cement dispersant onto cement particles is carried out more rapidly with increase of the molecular weight thereof, and after the adsorption of high-molecular weight materials onto cement particles, low-molecular weight materials are subsequently adsorbed thereonto. We further found that this type of adsorption is started immediately after cement particles are brought into contact with the aqueous solution of the polycarboxylic acid type cement dispersant and the adsorption reaches a saturation point for about one hour or more.

In this case, the term "saturation point of the adsorption", although depending on the kind of the used polycarboxylic acid type cement dispersant, represents about 80%.

The characteristics of the condition (i) above are that the initial adsorption onto cement particles of the polycarboxylic acid type cement dispersant is repressed to the utmost and the subsequent adsorption is attained with time, and the cement-dispersing ability can be improved with time or maintained. On the other hand, the characteristics of the condition (ii) above are that the adsorption of the polycarboxylic acid type cement dispersant onto cement particles is finished in an extremely short time, and the initial cement-dispersing ability can be improved.

The method for the production of the polycarboxylic acid type polymer (A) is not particularly limited, so far as the desired distribution of the molecular weight as mentioned above be obtained. As examples thereof, such known polymerization methods as solution polymerization or bulk polymerization by the use of a polymerization initiator may be used.

The polymerization in a solvent may be carried out either batchwise or continuously. Typical examples of the solvent to be used therein include water; such alcohols as methyl alcohol, ethyl alcohol, and isopropyl alcohol; such aromatic or aliphatic hydrocarbons as benzene, toluene, xylene, cyclohexane, and n-hexane; such ester compounds as ethyl acetate; and such ketone compounds as acetone and methyl ethyl ketone. From the viewpoint of the solubility to be exhibited by the monomers as raw materials and the polymer (A) to be produced, it is preferred to use at least one member selected from the group consisting of water and lower alcohols of 1 to 4 carbon atoms. It is more preferable to use water rather than the other solvents enumerated above.

When the polymerization is effected in an aqueous solution, a water-soluble polymerization initiator is used. Typical examples of the polymerization initiator include persulfates of ammonia or alkali metals; hydrogen peroxide; and azo-amidine compounds such as azo-bis-2-methyl propion amidine hydrochloride. For the sake of the polymerization initiator, such an accelerating agent as sodium hydrogensulfite may be additionally used.

When a lower alcohol, an aromatic or aliphatic hydrocarbon, an ester compound, or a ketone compound is used as a solvent for the polymerization system, the polymerization initiators which are effectively usable include, for example, such peroxides as benzoyl peroxide and lauroyl peroxide; such hydroperoxides as cumene hydroperoxide; and such azo compounds as azo-bis-isobutyronitrile. In this case, such an accelerating agent as amine compounds may be additionally used for the sake of the polymerization initiator.

Further, when a mixed solvent of water and a lower alcohol is used, various polymerization initiators cited above, or a polymerization initiator in combination with an accelerating agent, may be suitably selected.

The polymerization initiators which are effectively usable for the bulk polymerization include, for example, such peroxides as benzoyl peroxide and lauroyl peroxide; such hydroperoxides as cumene hydroperoxide; and azo compounds as azo-bis-isobutyronitrile. The bulk polymerization is carried out at a temperature in the range of 50° to 200° C.

The carboxyl group of the polycarboxylic acid type polymer (A) may be either free or a salt with a desired neutralization ratio. The alkaline substance which is used therefor may be selected from, for example, inorganic salts such as hydroxides, chloride, and carbonates of monovalent metal and divalent metal; ammonia and organic amines.

For this neutralization, (a) a method which comprises polymerizing a monomer mixture (I) having an unsaturated carboxylic acid type monomer as an essential component, and optionally neutralizing the resultant polymer to a desired neutralization ratio, and (b) a method which comprises polymerizing a monomer mixture (I) having as a main component an unsaturated carboxylic acid type monomer to be neutralized to a desired neutralization ratio, and optionally improving the neutralization ratio may be suitably selected.

The method for the production of the cement dispersant in accordance with the present invention which is particularly preferably used may be exemplified the following method (1) or (2).

(1) A method which comprises drip-feeding a monomer mixture (I) containing an unsaturated carboxylic acid type monomer as an essential component into a reaction vessel containing water under such conditions that the amount of the monomer mixture (I) used is in the range of 10 to 28% by weight to that of the total starting raw materials, a polymerization temperature is not more than the cloud point of the monomer mixture (I), preferably in the range of 20° to 52° C., and the neutralization ratio of the monomer mixture (I) is in the range of 0 to 20 mol %, and carrying out the polymerization reaction.

(2) A method which comprises mixing a monomer mixture (I) containing an unsaturated carboxylic acid type monomer as an essential component with a chain transfer agent, and drip-feeding the mixture into a reaction vessel containing water under such conditions that the neutralization ratio of the monomer mixture (I) is in the range of 0 to 20 mol %, and carrying out the polymerization reaction.

The method (1) is a method which comprises placing water into a reaction vessel, and carrying out the polymerization reaction with an aqueous monomer mixture (I) solution and an aqueous solution of catalyst for polymerization separately drip-fed into the reaction vessel. In this case, the amount of the monomer mixture (I) used is preferably in the range of 10 to 28% based on the total amount of the raw materials used. If this amount exceeds 28%, there is excessive air-entraining. Conversely, if it is less than 10%, the pure content per unit product amount is too low to cause an economical problem. Further, for the purpose of obtaining a specific molecular weight distribution according to this invention, it is essential to carry out the polymerization reaction at a temperature not more than the cloud point of the monomer mixture (I), preferably in the range of 20° to 52° C. The neutralization ratio of the monomer mixture (I) is in the range of 0 to 20 mol %. If this neutralization ratio exceeds 20 mol %, water-reducing ability is disadvantageously lowered. The polymerization reaction is started under such conditions by heating water in a reaction vessel to a specific temperature, separately drip-feeding an aqueous monomer mixture (I) solution and an aqueous solution of catalyst for polymerization at the same time. The aqueous monomer mixture (I) solution is drip-fed into water at a constant rate over 4 hours and the aqueous catalyst solution is drip-fed simultaneously into water starting at the same time, but the addition of the catalyst lasting for 5 hours. If the period for drip-feeding is shorter or longer than that period, the water-reducing ability and productivity may be unduly degraded. Further, in order to complete the polymerization of the monomer mixture, the period for drip-feeding an aqueous solution of catalyst for polymerization is set longer than that for drip-feeding an aqueous monomer mixture (I) solution, preferably by not less than 30 minutes, more preferably not less than one hour. After the drip-feeding of an aqueous solution of catalyst for polymerization is finished, the specific temperature is maintained for at least 30 minutes, preferably at least one hour, to allow the polymerization reaction to go to completion. Thus, the polymerization reaction is completed and the temperature is lowered and optionally the neutralization and the adjustment of the concentration are carried out.

The method (2) is a method which comprises placing water into a reaction vessel, pre-mixing a monomer mixture (I) with a chain transfer agent uniformly to prepare an aqueous solution (II), and carrying out the polymerization reaction with the resultant aqueous solution (II) and an aqueous solution of catalyst for polymerization separately drip-fed into the reaction vessel. For the purpose of obtaining a specific molecular weight distribution according to this invention, the chain transfer agent must be uniformly mixed with the aqueous monomer mixture (I) solution prior to the polymerization reaction. This mixing operation may be carried out either in the tank containing the aqueous monomer mixture (I) solution or in a feeding line between this tank and the reaction vessel by such a mixer as a static mixer. The mixing temperature is not more than 50° C. so as to prevent the polymerization with a chain transfer agent. The neutralization ratio of the monomer mixture (I) is in the range of 0 to 20 mol %. If this neutralization ratio exceeds 20 mol %, water-reducing ability is disadvantageously lowered. The polymerization reaction is started under such conditions by heating water in a reaction vessel to a specific temperature, separately drip-feeding the aqueous solution (II) and an aqueous solution of catalyst for polymerization at the same time. The separate drip-feeding is homogeneously performed for a period on the aqueous solution (II) of 4 hours, and on the aqueous solution of catalyst for polymerization of 5 hours, for example. Further, in order to complete the polymerization of the monomer mixture, the period for drip-feeding an aqueous solution of catalyst for polymerization is set longer than that for drip-feeding an aqueous solution (II), preferably by not less than 30 minutes, more preferably not less than one hour. After the drip-feeding of an aqueous solution of catalyst for polymerization is finished, the specific temperature is maintained for at least 30 minutes, preferably at least one hour, to allow the polymerization reaction to go to completion. Thus, the polymerization reaction is completed and the temperature is lowered and optionally the neutralization and the adjustment of the concentration are carried out.

The chain transfer agent which is usable in this invention is not particularly limited so far as it is a thiol type compound. As examples thereof, such known thiol type compounds as mercaptoethanol, thioglycerol, thioglycolic acid, 2-mercaptopropionic acid, 3-mercaptopropionic acid, thiomalic acid, thioglycolic acid octyl, 3-mercaptopropionic acid octyl, and 2-mercaptoethanesulfonic acid may be cited. These chain transfer agents may be used either singly or in the form of a mixture of two or more members.

The polymer (A), either singly or in a mixed state, may be used in the form of an aqueous solution directly as a cement dispersant. In addition, the polymer (A) may be used in combination with other well-known cement admixtures. Typical examples of these well-known cement admixtures include conventional cement dispersants, air-entraining agents, cement wetting agents, inflating agents, waterproofing agents, retardants, accelerating agents, water-soluble polymeric substances, thickening agents, flocculants, dry shrinkage decelerators, strength enhancers, hardening accelerators, and defoaming agents.

The cement dispersant of this invention can be used with such hydraulic cements as portland cement, alumina cement, Blite-rich cement, and various mixed cements or for hydraulic materials other than cements, such as gypsum.

To the mortar or concrete which uses hydraulic cement, for example, the cement dispersant of this invention can be added appropriately in an amount in the range of 0.01 to 1.0%, preferably 0.02 to 0.5%, based on the weight of the cement. The cement dispersant thus added brings about various advantageous effects such as reduction of slump loss, lowering of the unit water content, increasing the concrete strength, and enhancing the durability of the mortar or concrete. If the amount of the cement dispersant so added is less than 0.01%, the cement dispersant will not fully manifest its performance. Conversely, if this amount exceeds 1.0%, the excess will only prove uneconomical because the effect of the cement dispersant practically levels off at the upper limit of 1.0%.

The cement composition obtained by using the cement dispersant of this invention mentioned above comprises at least cement, water, and a cement dispersant as hereinabove described. It appropriately contains the cement dispersant in an amount in the range of 0.01 to 1.0 part by weight, preferably 0.02 to 0.5 part by weight, based on 100 parts by weight of the solid cement content. When the cement composition is prepared so as to incorporate therein the cement dispersant of this invention in an amount satisfying the range mentioned above, it acquires a notable improvement in terms of the slump-retaining time and, at the same time, exhibits various advantageous effects such as a reduced unit water content, increased concrete strength, and enhanced durability of the mortar or concrete. The cement which may be incorporated in the cement composition is not particularly restricted. Examples of the suitable cement include such hydraulic cements as portland cement, alumina cement, Blite-rich cement, and various mixed cements. The fine aggregate and the coarse aggregate which may be included in the cement composition have no particular restriction. They may be suitably selected among the numerous kinds of fine and coarse aggregates now in popular use. The amounts of these fine and coarse aggregates introduced in the cement composition have no particular restriction but may be appropriately selected by any person skilled in the art to suit the materials to be used.

This invention will now be described more specifically with reference to working examples. This invention is not limited by these examples. As used in the examples, the symbol "1%" represents "% by weight" and the word "parts" represents "parts by weight" unless otherwise specified.

REFERENCE EXAMPLE 1

For the Production of a Cement Dispersant (1) of this Invention

In a glass reaction vessel provided with a thermometer, a stirrer, a dropping funnel, a nitrogen inlet tube, and a reflux condenser, 1,698 parts of water was placed and kept stirred and the air in the vessel was flushed out with nitrogen and the water was heated therein to 80° C. An aqueous monomer mixture solution was prepared by mixing 1,668 parts of methoxy polyethylene glycol monomethacrylic ester (average number of addition mols of ethylene oxide of 25), 332 parts of methacrylic acid and 500 parts of water and further uniformly mixing the resultant mixed solution with 16.7 parts of mercapto propionic acid as a chain transfer agent. The obtained aqueous monomer mixture solution and 184 parts of an aqueous 10% ammonium persulfate solution were each added dropwise over a period of 4 hours. After the dropwise addition was completed, 46 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (1) of this invention formed of an aqueous solution of a polymer having a weight average molecular weight of 23,800 (in terms of polyethylene glycol determined by GPC; which definition invariably applies hereinafter) and a peak top molecular weight of 18,200 was obtained by neutralizing the reaction solution with an 30% aqueous sodium hydroxide solution.

REFERENCE EXAMPLE 2

For the Production of a Cement Dispersant (2) of this Invention

In a glass reaction vessel provided with a thermometer, a stirrer, a dropping funnel, a nitrogen inlet tube, and a reflux condenser, 1,520 parts of water was placed and kept stirred and the air in the vessel was flushed out with nitrogen and the water was heated therein to 50° C. An aqueous monomer mixture solution comprising 790 parts of methoxy polyethylene glycol monomethacrylic ester (average number of addition mols of ethylene oxide of 10), 189 parts of methacrylic acid, 26 parts of sodium methacrylate and 1500 parts of water, and 400 parts of an aqueous 10% ammonium persulfate solution, and 400 parts of an aqueous 5% sodium hydrogen sulfite solution were each added dropwise over a period of 4 hours. After the dropwise addition was completed, 100 parts of an aqueous 10% ammonium persulfate solution and 100 parts of an aqueous 5% sodium hydrogen sulfite solution were further added thereto over a period of 1 hour. The reaction vessel and the contents thereof were continuously kept at a temperature of 50° C. for 1 hour to complete the polymerization reaction. A cement dispersant (2) of this invention formed of an aqueous solution of a polymer having a weight average molecular weight of 33,300 and a peak top molecular weight of 31,800 was obtained by neutralizing the reaction solution with an 30% aqueous sodium hydroxide solution.

REFERENCE EXAMPLE 3

For the Production of a Cement Dispersant (3) of this Invention

In a glass reaction vessel provided with a thermometer, a stirrer, a dropping funnel, a nitrogen inlet tube, and a reflux condenser, 1,700 parts of water was placed and kept stirred and the air in the vessel was flushed out with nitrogen and the water was heated therein to 80° C. An aqueous monomer mixture solution was prepared by mixing 1,580 parts of methoxy polyethylene glycol monomethacrylic ester (average number of addition mols of ethylene oxide of 25), 420 parts of methacrylic acid and 500 parts of water, and further uniformly mixing the resultant mixed solution with 14.5 parts of mercapto propionic acid as a chain transfer agent. The obtained aqueous monomer mixture solution and 184 parts of an aqueous 10% ammonium persulfate solution were each added dropwise respectively over a period of 4 hours. After the dropwise addition was completed, 46 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (3) of this invention formed of an aqueous solution of a polymer having a weight average molecular weight of 28,600 and a peak top molecular weight of 22,500 was obtained by neutralizing the reaction solution with an 30% aqueous sodium hydroxide solution.

REFERENCE EXAMPLE 4

For the Production of a Cement Dispersant (4) of this Invention

In a glass reaction vessel provided with a thermometer, a stirrer, a dropping funnel, a nitrogen inlet tube, and a reflux condenser, 1,698 parts of water was placed and kept stirred and the air in the vessel was flushed out with nitrogen and the water was heated therein to 80° C. An aqueous monomer mixture solution was prepared by mixing 1,796 parts of methoxy polyethylene glycol monomethacrylic ester (average number of addition mols of ethylene oxide of 25), 204 parts of methacrylic acid and 500 parts of water, and further uniformly mixing the resultant mixed solution with 16.7 parts of mercapto propionic acid as a chain transfer agent. The resultant aqueous monomer mixture solution and 184 parts of an aqueous 10% ammonium persulfate solution was each added dropwise over a period of 4 hours respectively. After the dropwise addition was completed, 46 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (4) of this invention formed of an aqueous solution of a polymer having a weight average molecular weight of 20,500 and a peak top molecular weight of 15,300 was obtained by neutralizing the reaction solution with an 30% aqueous sodium hydroxide solution.

REFERENCE EXAMPLE 5

For the Production of a Cement Dispersant (5) of this Invention

In a glass reaction vessel provided with a thermometer, a stirrer, a dropping funnel, a nitrogen inlet tube, and a reflux condenser, 1,703 parts of water was placed and kept stirred and the air in the vessel was flushed out with nitrogen and the water was heated therein to 80° C. An aqueous monomer mixture solution was prepared by mixing 1,858 parts of methoxy polyethylene glycol monomethacrylic ester (average number of addition mols of ethylene oxide of 25), 142 parts of methacrylic acid and 500 parts of water, and further uniformly mixing the resultant mixed solution with 12.1 parts of mercapto propionic acid as a chain transfer agent. The resultant aqueous monomer mixture solution and 184 parts of an aqueous 10% ammonium persulfate solution were each added dropwise over a period of 4 hours respectively. After the dropwise addition was completed, 46 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (5) of this invention formed of an aqueous solution of a polymer having a weight average molecular weight of 32,800 and a peak top molecular weight of 26,400 was obtained by neutralizing the reaction solution with an 30% aqueous sodium hydroxide solution.

The contents of these cement dispersants (1) through (5) obtained in Reference Examples 1 through 5 are shown in Table 1.

TABLE 1

| | Cement dispersant of this invention | Polymerization concentration[a] (%) | Polymerization temperature (° C.) | Monomer mixture (I) | | | | |
|---|---|---|---|---|---|---|---|---|
| | | | | Monomer composition ratio (wt) | Cloud point[b] (° C.) | Neutralization ratio[c] (%) | Polymerization method[d] | Chain transfer agent |
| Reference Example 1 | (1) | 45 | 80 | MPEGMMA(n = 25)/MAA/SMAA = 83.4/16.6/0 | >10 | 0 | Dropping method | MPA |
| Reference Example 2 | (2) | 20 | 50 | MPEGMMA(n = 10)/MAA/SMAA = 78.6/18.8/2.6 | 52 | 10 | Dropping method | None |
| Reference Example 3 | (3) | 45 | 80 | MPEGMMA(n = 25)/MAA/SMAA = 89.0/21.0/0 | >100 | 0 | Dropping method | MPA |

TABLE 1-continued

| | | | | | | | | |
|---|---|---|---|---|---|---|---|---|
| Reference Example 4 | (4) | 45 | 80 | MPEGMMA(n = 25)/MAA/SMAA = 99.8/10.2/0 | >100 | 0 | Dropping method | MPA |
| Reference Example 5 | (5) | 45 | 80 | MPEGMMA(n = 25)/MAA/SMAA = 92.9/7.1/0 | >100 | 0 | Dropping method | MPA |

| | Cement dispersant of this invention | Time (hr) | | | | | Weight average molecular weight (Mw) | Peak top molecular weight (Mp) | Mw–Mp |
|---|---|---|---|---|---|---|---|---|---|
| | | Dropping of monomer mixture | Dropping of chain transfer agent | Dropping of catalyst | Aging | Total | | | |
| Reference Example 1 | (1) | 4 | | 5 | 1 | 6 | 23,800 | 18,200 | 5,600 |
| Reference Example 2 | (2) | 4 | | 5 | 1 | 6 | 33,300 | 318,00 | 1,500 |
| Reference Example 3 | (3) | 4 | | 5 | 1 | 6 | 26,600 | 22,500 | 6,100 |
| Reference Example 4 | (4) | 4 | | 5 | 1 | 6 | 20,500 | 15,300 | 5,200 |
| Reference Example 5 | (5) | 4 | | 5 | 1 | 6 | 32,800 | 26,400 | 6,400 |

[a]Weight % of the monomer at completion of polymerization.
[b]Cloud point of an aqueous monomer mixture solution at the concentration of 20%.
[c]Neutralization ratio of (meth)acrylic acid.
[d]Dropping method is a method for dropping an aqueous monomer mixture solution into a reaction vessel, and a blanket method is a method for previously charging an aqueous monomer mixture solution into a reaction vessel.
(Abbreviation) MPEGMMA: methoxy polyethylene glycol monomethacrylate;
n: average addition mol number of oxyalkylene group; MAA: methacrylic acid; SMAA: sodium methacrylate; MPA: mercaptopropionic acid.

Reference Control 1 for the Production of a Cement Dispersant (1) for Comparison A cement dispersant (1) for comparison containing an aqueous solution of a polymer having a weight average molecular weight of 5,100 and a peak top molecular weight of 4,400 was obtained by a method similar to that in Reference Example 2 except that 147 parts of methacrylic acid and 79 parts of sodium methacrylate were used instead of 189 parts of methacrylic acid and 26 parts of sodium methacrylate, and the amount of water placed into the reaction vessel was changed to 1,564 parts.

Reference Control 2 for the Production of a Cement Dispersant (2) for Comparison A cement dispersant (2) for comparison containing an aqueous solution of a polymer having a weight average molecular weight of 9,000 and a peak top molecular weight of 5,700 was obtained by a method similar to that in Reference Example 2 except that 263 parts of sodium methacrylate was used instead of 189 parts of methacrylic acid and 26 parts of sodium methacrylate, and the amount of water placed into the reaction vessel was changed to 1,712 parts.

Reference Control 3 for the Production of a Cement Dispersant (3) for Comparison In a glass reaction vessel provided with a thermometer, a stirrer, a dropping funnel, a nitrogen inlet tube, and a reflux condenser, 886 parts of water was placed and kept stirred and the air in the vessel was flushed out with nitrogen and the water was heated therein to 50° C. An aqueous monomer mixture solution consisting of 711 parts of methoxy polyethylene glycol monomethacrylic ester (average number of addition mols of ethylene oxide of 10), 170 parts of methacrylic acid, 24 parts of sodium methacrylate and 226 parts of water, and 400 parts of an aqueous 10% ammonium persulfate solution, and 400 parts of an aqueous 5% sodium hydrogen sulfite solution were each added dropwise over a period of 4 hours. After the dropwise addition was completed, 100 parts of an aqueous 10% ammonium persulfate solution and 100 parts of an aqueous 5% sodium hydrogen sulfite solution were further added thereto over a period of 1 hour. The reaction vessel and the contents thereof were continuously kept at a temperature of 50 C for 1 hour to complete the polymerization reaction. A cement dispersant (3) for comparison formed of an aqueous solution of a polymer having a weight average molecular weight of 31,100 and a peak top molecular weight of 34,300 was obtained by neutralizing the reaction solution with an 30% aqueous sodium hydroxide solution.

Reference Control 4 for the Production of a Cement Dispersant (4) for Comparison In a glass reaction vessel provided with a thermometer, a stirrer, a dropping funnel, a nitrogen inlet tube, and a reflux condenser, 380 parts of water was placed and kept stirred and the air in the vessel was flushed out with nitrogen and the water was heated therein to 50° C. An aqueous monomer mixture solution consisting of 1,185 parts of methoxy polyethylene glycol monomethacrylic ester (average number of addition mols of ethylene oxide of 10), 283 parts of methacrylic acid, 40 parts of sodium methacrylate and 377 parts of water, 300 parts of an aqueous 20% ammonium persulfate solution, and 300 parts of an aqueous 10% sodium hydrogen sulfite solution were each added dropwise over a period of 4 hours. After the dropwise addition was completed, 75 parts of an aqueous 20% ammonium persulfate solution and 75 parts of an aqueous 10% sodium hydrogen sulfite solution were further added thereto over a period of 1 hour. The reaction vessel and the contents thereof were continuously kept at a temperature of 50° C. for 1 hour to complete the polymerization reaction. The polymer thus obtained was an inappropriate gel as the cement dispersant and the molecular weight could not be determined by GPC.

Reference Control 5 for the Production of a Cement Dispersant (5) for Comparison In a glass reaction vessel provided with a thermometer, a stirrer, a dropping funnel, a nitrogen inlet tube, and a reflux condenser, an aqueous monomer mixture solution comprising 632 parts of methoxy polyethylene glycol monomethacrylic ester (average number of addition mols of ethylene oxide of 10), 151 parts of methacrylic acid, 21 parts of sodium methacrylate, and 2,466 parts of water was placed and kept stirred and the air in the vessel was flushed out with nitrogen and the water was heated therein to 50° C. 300 parts of an aqueous 10% ammonium persulfate solution and 300 parts of an aqueous 5% sodium hydrogen sulfite solution were each added dropwise over a period of 4 hours. After the dropwise addition was completed, 75 parts of an aqueous 10% ammonium persulfate solution and 75 parts of an aqueous 5% sodium hydrogen sulfite solution were further added thereto over a period of 1 hour. The reaction vessel and the contents thereof were continuously kept at a temperature of 50° C. for 1 hour to complete the polymerization reaction. The polymer thus obtained was an inappropriate gel as the cement dispersant and the molecular weight could not be determined by GPC.

Reference Control 6 for the Production of a Cement Dispersant (6) for Comparison In a glass reaction vessel provided with a thermometer, a stirrer, a dropping funnel, a nitrogen inlet tube, and a reflux condenser, an aqueous monomer mixture solution comprising 1,422 parts of methoxy polyethylene glycol monomethacrylic ester (average number of addition mols of ethylene oxide of 25), 378 parts of methacrylic acid, 27 parts of mercapto propionic acid as a chain transfer agent, and 1,968 parts of water was placed land kept stirred and the air in the vessel was flushed out with nitrogen and the water was heated therein to 80° C. 165 parts of an aqueous 10% ammonium persulfate solution was added dropwise over a period of 4 hours. After the dropwise addition was completed, 40 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (6) for comparison formed of an aqueous solution of a polymer having a weight average molecular weight of 20,000 and a peak top molecular weight of 9,100 was obtained by neutralizing the reaction solution with an 30% aqueous sodium hydroxide solution.

Reference Control 7 for the Production of a Cement Dispersant (7) for Comparison In a glass reaction vessel provided with a thermometer, a stirrer, a dropping funnel, a nitrogen inlet tube, and a reflux condenser, 2,425 parts of water was placed and kept stirred and the air in the vessel was flushed out with nitrogen and the water was heated therein to 95° C. An aqueous monomer mixture solution comprising 790 parts of methoxy polyethylene glycol monomethacrylic ester (average number of addition mols of ethylene oxide of 10), 189 parts of methacrylic acid, 26 parts of sodium methacrylate and 1,500 parts of water, and 75 parts of an aqueous 10% ammonium persulfate solution were each added dropwise over a period of 4 hours. After the dropwise addition was completed, 20 parts of an aqueous 10% ammonium persulfate solution was further added thereto over a period of 1 hour. The reaction vessel and the contents thereof were continuously kept at a temperature of 95° C. for 1 hour to complete the polymerization reaction. A cement dispersant (7) for comparison formed of an aqueous solution of a polymer having a weight average molecular weight of 35,000 and a peak top molecular weight of 18,300 was obtained by neutralizing the reaction solution with an 30% aqueous sodium hydroxide solution.

Reference Control 8 for the Production of a Cement Dispersant (8) for Comparison In a glass reaction vessel provided with a thermometer, a stirrer, a dropping funnel, a nitrogen inlet tube, and a reflux condenser, 1,551 parts of water was placed and kept stirred and the air in the vessel was flushed out with nitrogen and the water was heated therein to 80° C. An aqueous monomer mixture solution consisting of 1,668 parts of methoxy polyethylene glycol monomethacrylic ester (average number of addition mols of ethylene oxide of 25), 320 parts of methacrylic acid, 15 parts of sodium methacrylate and 500 parts of water, and 184 parts of an aqueous 10% ammonium persulfate solution, and 167 parts of 10% mercapto propionic acid were each added dropwise over a period of 4 hours. After the dropwise addition was completed, 46 parts of an aqueous 10% ammonium persulfate solution was further added thereto over a period of 1 hour. The reaction vessel and the contents thereof were continuously kept at a temperature of 80° C. for 1 hour to complete the polymerization reaction. A cement dispersant (8) for comparison formed of an aqueous solution of a polymer having a weight average molecular weight of 21,000 and a peak top molecular weight of 12,700 was obtained by neutralizing the reaction solution with an 30% aqueous sodium hydroxide solution.

The contents of these cement dispersants (1) through (8) for comparison obtained in Reference Controls 1 through 8 were shown in Table 2.

TABLE 2

| | Cement dispersant for comparision | Polymerization concentration[a] (%) | Polymerization temperature (° C.) | Monomer mixture | | | | |
|---|---|---|---|---|---|---|---|---|
| | | | | Monomer composition ratio (wt) | Cloud point[b] (° C.) | Neutralization ratio[c] (%) | Polymerization method[d] | Chain transfer agent |
| Reference Control 1 | (1) | 20 | 50 | MPEGMMA(n = 10)/MAA/SMAA = 77.8/14.5/7.7 | 68 | 30 | Dropping method | None |
| Reference Control 2 | (2) | 20 | 50 | MPEGMMA(n = 10)/MAA/SMAA = 75.0/0/25.0 | >100 | 100 | Dropping method | None |
| Reference Control 3 | (3) | 30 | 50 | MPEGMMA(n = 10)/MAA/SMAA = 79.6/18.8/2.6 | 52 | 10 | Dropping method | None |
| Reference Control 4 | (4) | 50 | 50 | MPEGMMA(n = 10)/MAA/SMAA = 79.6/18.8/2.6 | 52 | 10 | Dropping method | None |
| Reference Control 5 | (5) | 20 | 50 | MPEGMMA(n = 10)/MAA/SMAA = 78.6/18.8/2.6 | 52 | 10 | Blanket method | None |
| Reference Control 6 | (6) | 45 | 80 | MPEGMMA(n = 25)/MAA/SMAA = 79.0/21.0/0 | >100 | 0 | Blanket method | MPA |

TABLE 2-continued

| Reference Control 7 | (7) | 20 | 95 | MPEGMMA(n = 10)/MAA/SMAA = 79.6/18.8/2.6 | 52 | 10 | Dropping method | None |
| Reference Control 8 | (8) | 45 | 80 | MPEGMMA(n = 25)/MAA/SMAA = 83.3/16.0/0.7 | >100 | 4 | Dropping method | None |

| | Cement dispersant for comparision | Time (hr) | | | | | Weight average molecular weight (MW) | Peak top molecular weight (Mp) | Mw–Mp |
| --- | --- | --- | --- | --- | --- | --- | --- | --- | --- |
| | | Dropping of monmer mixture | Dropping of chain transfer agent | Dropping of catalyst | Aging | Total | | | |
| Reference Control 1 | (1) | 4 | | 5 | 1 | 6 | 5,100 | 4,400 | 700 |
| Reference Control 2 | (2) | 4 | | 5 | 1 | 6 | 9,000 | 5,700 | 3,300 |
| Reference Control 3 | (3) | 4 | | 5 | 1 | 6 | 31,100 | 34,300 | −3,200 |
| Reference Control 4 | (4) | 4 | | 5 | 1 | 6 | | gelled | |
| Reference Control 5 | (5) | | | 5 | 1 | 6 | | gelled | |
| Reference Control 6 | (6) | | | 5 | 1 | 6 | 20,000 | 9,100 | 10,900 |
| Reference Control 7 | (7) | 4 | | 5 | 1 | 6 | 35,000 | 18,300 | 16,700 |
| Reference Control 8 | (8) | 4 | 4(MPA) | 5 | 1 | 6 | 21,000 | 12,700 | 83,000 |

[a]Weight % of the monomer at completion of polymerization.
[b]Cloud point of an aqueous monomer mixture solution at the concentratian of 20%.
[c]Neutralization ratio of (meth) acrylic acid.
[d]Dropping method is a method for dropping an agueous monomer mixture solution into a reaction vessel, and a blanket method is a method for previously charging an aqueous monomer mixture solution into a reaction vessel.
(Abbreviatian) MPEGMMA: methoxy polyethylene glycol monomethacrylate; n: average addition mol number of oxyalkylene group; MAA: methacrylic acid; SMAA: sodium methacrylate; MPA: sercaptapropionic acid.

Example 1 and Control 1

Concrete Test 1

Standard portland cement (product of Chichibu Onoda Cement Co., Ltd.) was used as a cement, a mixed sand of land sand produced along the river of Oi and mountain sand produced near Kisarazu (specific gravity of 2.62 and FM of 2.71) as a fine aggregate, and crushed sand stones produced near Ome (specific gravity of 2.64 and MS of 20 mm) as a coarse aggregate.

The cement dispersant (2) of this invention shown in Table 1 and the cement dispersant (7) for comparison shown in Table 2 were used to prepare various samples of concrete.

The samples of concrete having these cement dispersants introduced therein were prepared under the conditions of unit cement content of 320 kg/m$^3$, unit water content of 166 kg/m$^3{}_1$ water/cement ratio (by weight) of 51.9%, water-reducing ratio of 18%, and sand percentage of 49%. The amounts of the cement dispersants (parts by weight) which were added per 100 parts by weight of solid cement content were as shown in Table 3 below. Further, an amount of air was controlled to 4±1% by using a commercially available air-entraining agent, if necessary.

The samples of 50 liters of concrete produced using a forced kneading mixer under the conditions shown above were tested for changes of the magnitude of slump with time, to evaluate the slump loss. The methods for determining the slump value and air content were in conformity with Japanese Industrial Standards (JIS) A1101, 1128, and 6204. The results are shown in Table 3.

TABLE 3

| | Used cement dispersant | | Slump value (cm) | | |
| --- | --- | --- | --- | --- | --- |
| Example | Name | Amount of addition (%) | Immediately after kneading | After 30 min. | After 60 min. |
| Example 1 | Cement dispersant (2) | 0.15 | 18 | 16 | 13 |
| Control 1 | Cement dispersant for comparison (7) | 0.135 | 18 | 15 | 10 |

(Remarks)
Amount of addition is calculated as a solid content to that of cement.
Amount of air is controlled to 4 ± 1%, if necessary using a commercially available air-entraining agent.

It is noticeable from Table 3 that the samples of concrete using the cement dispersant of this invention were notably better in terms of slump-retaining time compared with the species of concrete using the cement dispersant for comparison. That is, the polymerization carried out at a temperature not more than the cloud point of the monomer mixture (I) as shown in the cement dispersant (2) of this invention is preferable with respect to slump loss-preventing ability.

Example 2 and Control 2

Concrete Test 2

Standard portland cement (product of Chichibu Onoda Cement Co., Ltd.) was used as a cement, a sand of land sand produced along the river of Oi (specific gravity of 2.62 and FM of 2.71) as a fine aggregate, and crushed sand stones produced near Ome (specific gravity of 2.64 and MS of 20 mm) as a coarse aggregate.

The cement dispersant (1) of this invention shown in Table 1 and the cement dispersant (8) for comparison shown in Table 2 were used to prepare various samples of concrete.

The samples of concrete having these cement dispersants incorporated therein were prepared under the conditions of unit cement content of 660 kg/m³, unit water content of 165 kg/m³, water/cement ratio (by weight) of 25%, and sand percentage of 40%. The amounts of the cement dispersants (parts by weight) which were added per 100 parts by weight of solid cement content were as shown in Table 4 below. Further, an amount of air was controlled to 1 to 2% by using a commercially-available defoaming agent.

The samples of 50 liters of concrete produced by mixing mortar for 90 seconds using a forced kneading mixer and then charging the coarse aggregate and kneading for 90 seconds were tested for the time until the mortar began to be fluidized and the changes in slump flow value with time. The methods for determining the slump flow value and air content were in conformity with Japanese Industrial Standards (JIS) A 1101, 1128, and 6204. The result s are shown in Table 4.

TABLE 4

| | Used cement dispersant | | | Slump flow value (mm) | | |
|---|---|---|---|---|---|---|
| | Name | Amount of addition (%) | Kneading time required for the mortar fluidized (Sec) | Immediately after kneading | After 30 min. | After 60 min. |
| Example 2 | Cement dispersant (1) of this invention | 0.15 | 75 | 695 | 655 | 585 |
| Control 2 | Cement dispersant (8) for comparison | 0.22 | 75 | 680 | 590 | 440 |

(Remarks)
Amount added is calculated as a solid content to that of cement.
Amount of air was controlled to 1 to 2% by using a commercially available defoaming agent.

It is noticeable from Table 4 that the samples of concrete using the cement dispersants of this invention were appreciably better in terms of slump-retaining time and water-reducing ability, compared to the samples of concrete using the cement dispersants for comparison. That is, the polymerization reaction carried out by previously mixing the monomer mixture (I) with the chain transfer agent and then drip-feeding the mixture into a reaction vessel is preferable f or the prevention of slump loss and for the reduction of the amount added.

It is also demonstrated from Tables 3 and 4 that the ability to prevent slump loss and the water-reducing ability are dependent on the polymerization method for producing a cement dispersant, which is due to the difference of the molecular weight distributions of the polymers as described above. For example, the molecular weight distributions of the cement dispersant (2) of this invention and the cement dispersant (7) for comparison are shown in FIG. 1.

Examples 3 to 5 and Controls 3 to 7
Mortar Test

In order to study basic properties of the cement dispersants (1) through (3) of this invention shown in Table 1 and the cement dispersants (1), (2), (3), (6) and (8) for comparison shown in Table 2, flow values and amounts of air of the mortars having the cement dispersants introduced therein were determined. The mortar was prepared by kneading 400 parts of portland cement produced by Chi chibu Onoda Cement Co., Ltd., 800 parts of standard sand obtained from Toyoura, and 240 parts of water containing the cement dispersant of this invention or the cement dispersant for comparison. The mortar thus obtained was then packed into a hollow cylinder having 55 mm of an inner diameter and 55 mm of a height by a top and placed on a horizontal table, and the cylinder was lifted up gradually in a vertical direction. A long diameter and a short diameter of the mortar spread on the table were determined, and the average value was decided as a flow value. Further, the amount of air was calculated from a volume and weight of the mortar and a specific gravity of the used material. The results were shown in Table 5.

TABLE 5

| Example | Cement dispersant | Flow value (mm) | Amount of air (%) |
|---|---|---|---|
| Example 3 | Cement dispersant (1) of this invention | 111 | 6.5 |
| Example 4 | Cement dispersant (2) of this invention | 105 | 10.0 |
| Example 5 | Cement dispersant (3) of this invention | 105 | 6.3 |
| Control 3 | Cement dispersant (1) for comparison | 87 | 8.9 |
| Control 4 | Cement dispersant (2) for comparison | 77 | 9.2 |
| Control 5 | Cement dispersant (3) for comparison | 102 | 11.4 |
| Control 6 | Cement dispersant (6) for comparison | 92 | 5.3 |
| Control 7 | Cement dispersant (8) for comparison | 91 | 4.7 |

(Remarks)
The amount of the cement dispersant added was 0.16% to that of cement, calculated as a solid content.

It may clearly be seen from Examples 3 to 5 and Controls 3 and 4 that the lower the neutralization ratio of the monomer mixture (I), the higher the flow value.

In Example 4, Control 5 and Reference Control 4, an optimum polymerization concentration when a polymerization temperature is 50° C., not more than the cloud point of the monomer mixture (I) and the neutralization ratio of the monomer mixture (I) is 10% was studied to find that the polymer was gelatinized in a polymerization concentration of 50%, and air-entraining property was unduly high in a polymerization concentration of 30%, both of which were undesirable.

In Example 5 and Control 6, and Example 4 and Reference Control 5, effects of difference of polymerization mode were studied. In a blanket method wherein the monomer mixture is charged collectively in a reaction vessel, it is clear that the chain transfer agent is necessary in order to suppress the chain transfer agent is necessary in order to suppress the gelatinization of the polymer. It is also clear that a polymer with higher flow value is attained by using a drip-feeding method wherein the monomer mixture is drip-fed into a reaction vessel.

Comparing Example 3 with Control 7, the method wherein the chain transfer agent has been previously mixed with the monomer mixture (I) gives rise to higher flow value. It is a matter of course that this fact corresponds with the results of Table 4.

Examples 6 to 10 and Control 8
Determination of Adsorption Ratio to Cement

Adsorption ratios of the clement dispersants (1) to (5) of this invention, and naphthalene sulfuric acid-formaldehyde condensate (NSF) for comparison shown in Table 1 were determined. The method for determination was as follows:

(1) The cement dispersant (1) of this invention obtained in Reference Example 1 was charged into a beaker so as to be 0.2% to the cement as a solid content, and water was added so as to be 10% of water/cement ratio (weight ratio).

(2) A desired amount of cement (high flow cement produced by Chichibu Onoda Cement Co., Ltd.) was added into the beaker, mixed by stirring for 5 minutes and filtered, to collect the filtrate.

(3) Mixing time was set to 60 minutes and the operations of (1) and (2) were repeated.

(4) A concentration of the cement dispersant remained in the filtrate thus obtained was determined by a differential refractive index dector.

(5) Similar operations were repeated about the cement dispersants (2) to (5) of this invention obtained in Reference Examples 3 to 7.

(6) Adsorption ratio of the cement dispersant is determined by the following equation:

Adsorption ratio (%)=[{(Concentration of cement dispersant added)−(Concentration of cement dispersant remained in filtrate)}/{Concentration of cement dispersant added}]×100

If all the cement dispersant is adsorbed onto cement particles and no cement dispersant is detected in the filtrate, the adsorption ratio is calculated as 100%.

The results of the adsorption ratios are shown in Table 6.

TABLE 6

| | | Adsorption ratio (%) | | | |
|---|---|---|---|---|---|
| Example | Cement dispersant | After 5 min | After 60 min. | After 90 min. | After 120 min. |
| Example 6 | Cement dispersant (1) of this invention | 60 | 75 | 76 | 76 |
| Example 7 | Cement dispersant (2) of this invention | 70 | 88 | 89 | 89 |
| Example 8 | Cement dispersant (3) of this invention | 76 | 83 | 83 | 83 |
| Example 9 | Cement dispersant (4) of this invention | 46 | 59 | 61 | 64 |
| Example 10 | Cement dispersant (5) of this invention | 21 | 46 | 48 | 49 |
| Control 8 | NSF | 83 | 88 | 88 | 88 |

It is noted from Table 6 that for the cement dispersants (1) through (3) of this invention, no increase in the adsorption ratio was recognized after 60 minutes, while for the cement dispersants (4) and (5) of this invention, the adsorption ratio was increased even after 120 minutes indicating that they do not reach the saturation points.

Examples 11 to 14 and Control 9

Concrete Test 3

Tests similar to Concrete test 1 were carried out except that the cement dispersants (1), (2), (4) and (5) of this invention and naphthalene sulfonic acid-formaldehyde condensate (NSF) for comparison were used as the cement dispersants, to determine the change of the slump with time. The results are shown in Table 7.

TABLE 7

| | Used cement dispersant | | Slump value (cm) | | |
|---|---|---|---|---|---|
| | Name | Amount of addition (%) | Immediately after mixing | After 30 min. | After 60 min. |
| Example 11 | Cement dispersant (1) of this invention | 0.135 | 17.5 | 15.0 | 12.0 |
| Example 12 | Cement dispersant (2) of this invention | 0.15 | 18.0 | 16.0 | 13.0 |
| Example 13 | Cement dispersant (4) of this invention | 0.135 | 19.0 | 17.5 | 15.5 |
| Example 14 | Cement dispersant (5) of this invention | 0.22 | 18.5 | 20.5 | 19.5 |
| Control 9 | NSF | 0.50 | 18.0 | 10.5 | 6.5 |

(Remarks)
Amount of addition is calculated as a solid content to that of cement.
NSF is sodium salt of naphthalene sulfonic acid-formaldehyde condensate.
Amount of air was controlled to 4 ± 1%, if necessary using a commercially available defoaming agent or air-entraining agent.

It is clearly noticeable from Table 7 that the cement dispersant of this invention is superior to the NSF in terms of the water-reducing ability and slump loss-preventing property. Further, comparing the results of the cement dispersants of this invention shown in Table 6, the cement dispersants having lower adsorption to cement after 5 minutes and larger difference between the adsorption ratio after 60 minutes and the adsorption ratio after 5 minutes give higher slump loss-preventing ability. It is also demonstrated that some concrete, such as that obtained in Example 14, show a higher slump value after 30 minutes than that immediately after kneading.

Examples 15 to 17 Control 10

Concrete Test 4

High flow cement (product of Chichibu Onoda Cement Co., Ltd.) as a cement, sand produced along the river of Oi (specific gravity of 2.62 and FM of 2.71) as a fine aggregate, and crushed sand stones produced near Ome (specific gravity of 2.64 and MS of 20 mm) as a coarse aggregate were used respectively.

The cement dispersants (1), (2), and (4) of this invention shown in Table 1 and naphthalene sulfonic acid-formaldehyde condensate (NSF) for comparison were used as the cement dispersants. The samples of concrete having the cement dispersants incorporated therein were prepared under the conditions of unit cement content of 553 kg/m$^3$, unit water content of 160 kg/m$^3$ water/cement ratio (by weight) of 29%, and sand percentage of 51%. The amounts of the cement dispersants (parts by weight) which were added per 190 parts by weight of solid cement content were as shown in Table 7. Amount of air was controlled to 1 to 2% using a commercially available defoaming agent.

Under such conditions as mentioned above, the mortar was kneaded for 90 seconds by a forced kneading mixer and the aggregate was charged, then kneaded for 90 seconds to obtain 50 liter of concrete. The time required for the mortar fluidized and the change of the slump flow value of the obtained concrete with time were then determined. The determination of slump flow value and amount of air were carried out in conformity with Japanese Industrial Standards (JIS) A 1101, 1128, and 6204. The results are shown in Table 8.

TABLE 8

| | Used cement dispersant | | Kneading time required for the mortar fluidized (Sec) | Slump flow value (mm) | | |
|---|---|---|---|---|---|---|
| | Name | Amount of addition (%) | | Immediately after kneading | After 30 min. | After 60 min. |
| Example 15 | Cement dispersant (1) of this invention | 0.20 | 15 | 750 | 700 | 540 |
| Example 16 | Cement dispersant (2) of this invention | 0.22 | 25 | 700 | 610 | 450 |
| Example 17 | Cement dispersant (4) of this invention | 0.23 | 40 | 690 | 690 | 680 |
| Control 10 | NSF | 0.50 | — | | | |

(Remarks)
Amount of addition is calculated as a solid content to that of cement.
NSF could not be kneaded.
Amount of air was controlled to 1 to 2% by using a commercially available defoaming agent.

It is clearly noticeable from Table 8 that the cement dispersants of this invention are superior to NSF in respect of the water-reducing property. Further, comparing the results of the cement dispersants of this invention shown in Table 6, it is also clearly demonstrated that when the adsorption ratio to cement after 5 minutes exceeds 60%, the time for fluidizing mortar is short and excellent water-reducing ability can be obtained. When comparing Example 15 with Example 16, the cement dispersant of Example 15, although having an adsorption ratio to cement after 5 minutes lower than that of Example 16, has a shorter kneading time of mortar, showing that the longer the polyethylene glycol chain is, the higher the water-reducing property becomes. In Example 17, the adsorption ratio to cement after 5 minutes is the lowest, namely 46%, showing the most excellent ability to prevent slump loss.

Example 18 to 20 and Control 11
Concrete Test 5

Standard portland cement (product of Chichibu Onoda Cement Co., Ltd.) as a cement, a sand produced along the river of Oi (specific gravity of 2.62 and FM of 2.71) as a fine aggregate, and crushed sand stones produced near Ome (specific gravity of 2.64 and MS of 20 mm) as a coarse aggregate were used respectively.

The cement dispersants (1) through (3) of this invention shown in Table 1 and naphthalene sulfonic acid-formaldehyde condensate (NSF) for comparison were used as the cement dispersant to prepare various samples of concrete.

The samples of concrete having the cement dispersants incorporated therein were prepared under the conditions of unit cement content of 550 kg/m$^3$, unit water content of 165 kg/m$^3$, water/cement ratio (by weight) of 30%, and sand percentage of 40%. The amounts of the cement dispersants (parts by weight) which were added per 100 parts by weight of solid cement content were as shown in Table 9. Further, the amount of air was controlled to 1 to 2% by using a commercially available deforming agent.

Under such conditions as described above, the mortar was kneaded for 40 seconds by a forced kneading mixer and the aggregate was charged, then kneaded for 90 seconds to obtain 35 liter of concrete. The time for fluidizing mortar, the slump flow value of the obtained concrete, and the compressive strength of concrete after 28 days were then also determined. The determination of slump flow value and amount of air were performed in conformity with Japanese Industrial Standards (JIS) A 1101, 1128 and 6204. The results are shown in Table 9.

TABLE 9

| | Used cement dispersant | | Kneading time required for the mortar fluidized (Sec) | Slump flow value immediately after kneading (mm) | Compression strength after 28 days (kg/cm$^2$) |
|---|---|---|---|---|---|
| | Name | Amount of addition (%) | | | |
| Example 18 | Cement dispersant (1) of this invention | 0.204 | 20 | 675 | 980 |
| Example 19 | Cement dispersant (2) of this invention | 0.24 | 30 | 680 | 925 |
| Example 20 | Cement dispersant (3) of this invention | 0.204 | 15 | 670 | 955 |
| Control 11 | NSF | 0.50 | — | — | — |

(Remarks)
Amount added is calculated as a solid content to that of cement.
NSF could not be kneaded.
Amount of air was controlled to 1 to 2% by using a commercially available defoaming agent.

It is clearly noticeable from Table 9 that the cement dispersant of this invention is superior to NSF in respect of water-reducing property. Further, comparing the results of cement dispersants of this invention shown in Table 6, the adsorption ratio onto cement particles after 5 minutes has no a relationship with the time for the mortar fluidized, when it is not less than 60%, and the time for kneading mortar is decreased in the proportion with the increase of the length of the polyethylene glycol chain, and therefore, the amount of the cement dispersant added can be decreased proportionately.

What is claimed is:
1. A cement composition comprising at least cement, water, and a cement dispersant, said cement dispersant comprising as a main component a polycarboxylic acid type polymer (A) obtained by copolymerizing:

5 to 98% by weight of an (alkoxy)polyalkylene glycol mono(meth)acrylic ester monomer (a) represented by the following general formula (1):

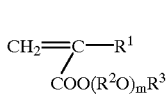

(1)

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene group;

95 to 2% by weight of a (meth)acrylic acid monomer (b) represented by the following general formula (2):

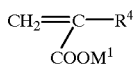

(2)

wherein $R^4$ is a hydrogen atom or a methyl group and $M^1$ is a hydrogen atom, a monovalent metal atom, a divalent metal atom, an ammonium group, or an organic amine group; and 0 to 50% by weight of a monomer (c) which is different than (a) and (b), and which is copolymerizable with (a) and (b);

wherein the total amount of (a), (b) and (c) is 100% by weight, or salt thereof, wherein said polymer (A) has a weight average molecular weight in the range of 10,000 to 500,000 in terms of polyethylene glycol determined by gel permeation chromatography, and has a value determined by subtracting the peak top molecular weight from the weight average molecular weight in the range of 0 to 8,000.

2. A cement composition comprising at least cement, water, and a cement dispersant, said cement dispersant comprising as a main component a polycarboxylic acid type polymer (A) or salt thereof, wherein said polymer (A) has a weight average molecular weight in the range of 10,000 to 500,000 in terms of polyethylene glycol determined by gel permeation chromatography, and has a value determined by subtracting the peak top molecular weight from the weight average molecular weight in the range of 0 to 8,000; and wherein said polycarboxylic acid type polymer (A) is obtained by copolymerizing: an (alkoxy)polyalkylene glycol mono(meth)acrylic ester monomer (a); a (meth)acrylic acid monomer (b) and, if necessary, a monomer (c) which is different than (a) and (b), and which is copolymerizable with (a) and (b).

3. A cement composition according to claim 2, wherein said polycarboxylic acid type polymer (A) is obtained by copolymerizing 5 to 98% by weight of polyalkylene glycol mono(meth)acrylic acid ester (a), 95 to 2% by weight of (meth)acrylic acid monomer (b) and 0 to 50% by weight of a monomer (c) which is different than (a) and (b), and which is copolymerizable with (a) and (b), wherein the total amount of (a), (b) and (c) is 100% by weight.

4. A cement composition according to claim 2, wherein said polycarboxylic acid type polymer (A) is obtained by copolymerizing 5 to 98% by weight of an (alkoxy)polyalkylene glycol mono(meth)acrylic ester monomer (a) represented by the following general formula (1):

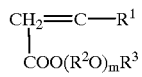

(1)

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of an oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene groups which is an integer in the range of 1 to 100;

95 to 2% by weight of a (meth)acrylic acid monomer (b) represented by the following general formula (2):

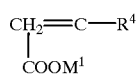

(2)

wherein $R^4$ is a hydrogen atom or a methyl group and $M^1$ is a hydrogen atom, a monovalent metal atom, a divalent metal atom, an ammonium group, or an organic amine group; and 0 to 50% by weight of a monomer (c) which is different than (a) and (b), and which is copolymerizable with (a) and (b);

wherein the total amount of (a), (b) and (c) is 100% by weight.

5. A cement composition according to claim 2, wherein said (alkoxy)polyalkylene glycol mono(meth)acrylic ester monomer (a) is (methoxy)polyalkylene glycol mono(meth)acrylate and said (meth)acrylic acid monomer (b) is (meth)acrylic acid.

6. A cement composition according to claim 2, wherein the adsorption ratio of the polymer (A) onto cement particles is not less than 60% at room temperature for five minutes when added in an amount of 0.2% by weight to that of the cement.

7. A cement composition according to claim 2, wherein said copolymerizable monomer (c) is at least one member selected from the group consisting of an ester of an aliphatic alcohol of 1 to 20 carbon atoms with (meth)acrylic acid; an unsaturated dicarboxylic acid and a monovalent metal salt, a divalent metal salt, ammonium salt, and an organic amine salt thereof; a monoester or a diester of said unsaturated dicarboxylic acid with an aliphatic alcohol of 1 to 20 carbon atoms, with a glycol of 2 to 4 carbon atoms, or with an (alkoxy)polyalkylene glycol of 2 to 100 addition mols of said glycol; an unsaturated amide; a vinyl ester; an aromatic vinyl; and an unsaturated sulfonic acid and a monovalent metal salt, divalent metal salt, ammonium salt, and an organic amine salt thereof.

8. A cement composition according to claim 2, wherein said neutralization of the (meth) acrylic acid monomer (c) is 0–20 mol %.

9. A cement composition according to claim 2, wherein said water/cement ratio is in the range of 0.15 to 0.4.

10. A cement composition comprising a cement dispersant, water, cement, and sand, wherein a mortar prepared by kneading 400 parts of Portland cement, 800 parts of standard sand obtained from Toyoura, and 240 parts of water which contains 0.16% by weight of the cement dispersant to cement has a mortar flow value of not less than 100 mm and an amount of entrained air of not more than 10%, wherein said cement dispersant is a polycarboxylic acid type polymer (A) obtained by copolymerizing:

5 to 98% by weight of an (alkoxy)polyalkylene glycol mono(meth)acrylic ester monomer (a) represented by the following general formula (1):

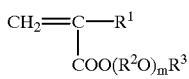

(1)

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene group;

95 to 2% by weight of a (meth)acrylic acid monomer (b) represented by the following general formula (2):

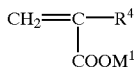

(2)

wherein $R^4$ is a hydrogen atom or a methyl group and $M^1$ is a hydrogen atom, a monovalent metal atom, a divalent metal atom, an ammonium group, or an organic amine group; and 0 to 50% by weight of a monomer (c) which is different than (a) and (b), and which is copolymerizable with (a) and (b);

wherein the total amount of (a), (b) and (c) is 100% by weight.

11. A cement composition comprising a polymer, cement, water, sand and coarse aggregate, wherein said polymer is contained in an amount of 0.15 to 0.29% by weight to the cement, water/cement ratio is 0.15 to 0.4, and slump flow value is 690 to 750 mm, wherein said cement composition is obtained by copolymerizing:

5 to 98% by weight of an (alkoxy)polyalkylene glycol mono(meth)acrylic ester monomer (a) represented by the following general formula (1):

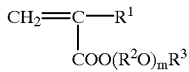

(1)

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene group;

95 to 2% by weight of a (meth)acrylic acid monomer (b) represented by the following general formula (2):

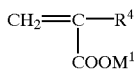

(2)

wherein $R^4$ is a hydrogen atom or a methyl group and $M^1$ is a hydrogen atom, a monovalent metal atom, a divalent metal atom, an ammonium group, or an organic amine group; and 0 to 50% by weight of a monomer (c) which is different than (a) and (b), and which is copolymerizable with (a) and (b);

wherein the total amount of (a), (b) and (c) is 100% by weight.

12. A cement composition according to claim 2, wherein said (alkoxy)polyalkylene glycol mono(meth)acrylic ester monomer (a) is selected from the group consisting of hydroxyethyl(meth)acrylate, hydroxypropyl(meth)acrylate, polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth)acrylate, polypropylene glycol polybutylene glycol mono(meth)acrylate, methoxy polyethylene glycol mono(meth)acrylate or methoxy polyethylene glycol polypropylene glycol mono(meth)acrylate.

13. A cement dispersant which comprises as a main component a polycarboxylic acid type polymer (A) obtained by copolymerizing:

5 to 98% by weight of an (alkoxy)polyalkylene glycol mono(meth)acrylic ester monomer (a) represented by the following general formula (1):

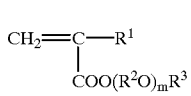

(1)

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene group;

95 to 2% by weight of a (meth)acrylic acid monomer (b) represented by the following general formula (2):

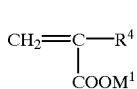

(2)

wherein $R^4$ is a hydrogen atom or a methyl group and $M^1$ is a hydrogen atom, a monovalent metal atom, a divalent metal atom, an ammonium group, or an organic amine group; and 0 to 50% by weight of a monomer (c) which is different than (a) and (b), and which is copolymerizable with (a) and (b);

wherein the total amount of (a), (b) and (c) is 100% by weight, or salt thereof, wherein said polymer (A) has a weight average molecular weight in the range of 10,000 to 500,000 in terms of polyethylene glycol determined by gel permeation chromatography, and has a value determined by subtracting the peak top molecular weight from the weight average molecular weight in the range of 0 to 8,000; wherein said polycarboxylic acid type polymer (A) is obtained by copolymerizing:

5 to 98% by weight of an (alkoxy)polyalkylene glycol mono(meth)acrylic ester monomer (a), 95 to 2% by weight of a (meth)acrylic acid monomer (b), and 0 to 50% by weight of a monomer (c) which is different than (a) and (b), and which is copolymerizable with (a) and (b);

wherein the total amount of (a), (b) and (c) is 100% by weight.

* * * * *

UNITED STATES PATENT AND TRADEMARK OFFICE
CERTIFICATE OF CORRECTION

PATENT NO.     : 6,376,581 B1
DATED          : April 23, 2002
INVENTOR(S)    : Yoshio Tanaka et al.

It is certified that error appears in the above-identified patent and that said Letters Patent is hereby corrected as shown below:

<u>Title page,</u>
The following is deleted:
"[73]   Assignee:     MBT Holding AG, Zurich (CH)"

The following is added:
-- [73]   Assignee:     Nippon Shokubai Co., Ltd., Osaka, Japan
                        MBT Holding AG, Zurich (CH) --

Signed and Sealed this

First Day of April, 2003

JAMES E. ROGAN
*Director of the United States Patent and Trademark Office*